United States Patent Office 3,383,174
Patented May 14, 1968

3,383,174
STABILIZATION OF HYDROGEN PEROXIDE
Glenn T. Carnine, Kenmore, N.Y., and Leonard R. Darbee, Trenton, N.J., assignors to FMC Corporation, New York, N.Y., a corporation of Delaware
No Drawing. Filed Apr. 7, 1965, Ser. No. 446,428
14 Claims. (Cl. 23—207.5)

ABSTRACT OF THE DISCLOSURE

Concentrated aqueous hydrogen peroxide solutions stable against decomposition by contaminants are provided. They contain as a stabilizer a synergistic combination of a tin compound soluble in aqueous hydrogen peroxide and a small amount of a nitrilotrimethylene phosphonic acid compound. Preferably a water soluble nitrate is also present.

This invention relates to the stabilization of aqueous hydrogen peroxide solutions, and particularly to stabilizing concentrated aqueous hydrogen peroxide solutions against the decomposing effects of contaminants introduced in dilution waters.

Many of the uses of hydrogen peroxide require a relatively dilute material, about 30 to 50% by weight in water, which the user either employs directly or dilutes in situ. Throughout this specification concentrations are given in weight percentage based on the total weight of the hydrogen peroxide solution. Such applications include the bleaching of textiles, pulp, paper and oils, and various chemical reactions.

Until quite recently aqueous hydrogen peroxide was nearly always manufactured and shipped at these low concentrations, because shipping of more highly concentrated product and dilution thereof at the end use site frequently resulted in substantial losses of the peroxygen compound upon introduction of dilution waters containing decomposition-inducing contaminants. However, the high cost of shipping and storing the low concentration hydrogen peroxide made it very desirable to manufacture and ship concentrated hydrogen peroxide, and dilute it at the point of delivery. This has made necessary the development of stabilizers for hydrogen peroxide which are effective to cope with the various contaminants introduced with typical waters available for dilution.

It is a feature of our invention to provide a stabilizer for aqueous hydrogen peroxide, particularly concentrated product having a concentration on the order of 70 to 98% by weight of hydrogen peroxide, which is effective against impurities, and particularly against the decomposing effect of impurities present in dilution waters commonly used to dilute the concentrated hydrogen peroxide to useful concentrations.

We have now found that concentrated aqueous hydrogen peroxide can be stabilized effectively against being decomposed by dilution waters containing substantial amounts of impurities, for example iron, copper, manganese, chromium and other metal ions frequently present in dilution waters, by incorporating in the hydrogen peroxide (a) 0.005 to 0.03% of any one of or a mixture of any of nitrilo trimethylene phosphonic acid, its ammonium salts and its alkali metal salts, materials which may be represented by the following formula:

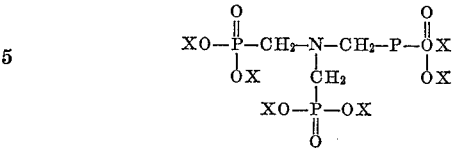

in which the X groups are hydrogen, ammonium or alkali metal groups, and (b) 0.001 to 0.015% of tin (calculated as the element) introduced as a tin compound which is soluble in aqueous hydrogen peroxide. Preferably the tin is introduced as sodium stannate, and more preferably as sodium stannate trihydrate, which has the formula $Na_2SnO_3 \cdot 3H_2O$.

For best stability the pH of the stabilized hydrogen peroxide solution is kept below 4 as measured with a glass electrode. When the pH is above 4 it can be adjusted to 4 or below with phosphoric acid, nitric acid or other inorganic or organic acid inert to hydrogen peroxide, and where the solution is too acidic for any particular use it can be adjusted to a proper pH with inert alkalies such as sodium hydroxide, sodium carbonate and the like.

These stabilizing additives suitably are introduced by adding each of them, in either order, to the hydrogen peroxide solution to be stabilized, with stirring, and permitting them to dissolve. However, in the presence of certain impurities, notably those present in hard waters, the stabilized hydrogen peroxide provided by introducing the stabilizer ingredients separately to the precursor hydrogen peroxide solution sometimes becomes turbid due to separation of some of the stabilizer. In a preferred embodiment of our invention the nitrilo trimethylene phosphonic acid or salt and the tin compound are dissolved together in aqueous hydrogen peroxide before use to provide a concentrated combination stabilizer solution containing at least 0.7% of the former and at least 0.3% of the latter. The concentrate is used in proportions to provide the lesser amounts of the two ingredients needed to stabilize hydrogen peroxide.

The chemical nature of the combination stabilizer solution is not known; however, when the components are employed together as the combination stabilizer they act quite differently than they do when they are added separately and directly to the hydrogen peroxide solution being stabilized. The effectiveness of the combination stabilizer is evidenced by both its stabilizing characteristics and its ability to provide water-white stabilized hydrogen peroxide solutions which remain water-white even when deleterious contaminants, including those present in hard waters, are introduced into the solutions.

Incorporation of the stabilizers of our invention into concentrated hydrogen peroxide makes it possible to dilute the concentrated material safely to concentrations of on the order of 30% to 50%, with waters containing large amounts of cation impurities e.g., iron, copper, manganese and the like ions, as well as other decomposition-inducing contaminants such as organic matter and the like. This makes is possible for a user to purchase the so-stabilized concentrated hydrogen peroxide, have it diluted in his own plant, and where necessary to store the material after dilution and before use without concern over the possibility of costly, and even hazardous, decomposition of the hydrogen peroxide.

The hydrogen peroxide to be stabilized can be that manufactured by any means, for example electrolytically, by an organic process such as the alternate oxidation and reduction of anthraquinones, oxidation of isopropyl alcohol, hydrolysis of peracetic acid or the like. Hydrogen peroxide prepared by these methods can be concentrated readily, for example by distillation methods such as those of U.S. Patents 2,684,889 to Crewson et al. issued July 27, 1954, and 3,152,052, to T. M. Jenney et al. issued Oct. 6, 1964, by freezing rectification as described in U.S. Patent 2,724,640 to Crewson et al. issued Nov. 22, 1955, or by other known methods.

As manufactured the hydrogen peroxide is extremely stable; manufacturers normally employ deionized or distilled water in preparing the product so that it initially contains very little in the way of impurities. Waters employed for diluting the hydrogen peroxide, on the other hand, contain cations and other impurities indigenous to the region where the waters are obtained. Furthermore, even where the hydrogen peroxide is not to be diluted impurities often find their way into it during its storage or use, and the stabilizers of this invention are very effective in combatting such impurities in aqueous hydrogen peroxide solutions of any concentration.

The stabilizer ingredients which constitute the stabilizer of our invention are a nitrilo trimethylene phosphonic acid compound and tin, the latter being introduced as a tin compound which is soluble in aqueous hydrogen peroxide of essentially any concentration; for example 10% to 100%. As used herein "soluble" includes colloidally dispersible. Examples of useful tin sources are sodium stannate, particularly the trihydrate of sodium stannate, stannic oxide, metastannic acid and stannous chloride. The tin is employed in the amount of about 0.001 to 0.015% in the aqueous hydrogen peroxide solution, the percentage being based on the actual weight of tin in the tin compound used.

The nitrilo trimethylene phosphonic acid compound is the acid or an alkali metal or ammonium salt of the acid. It is employed in the hydrogen peroxide being stabilized in the amount of about 0.005 to 0.030%.

Our preferred combination stabilizer is prepared by forming a first aqueous solution of the tin compound, preferably an aqueous solution containing about 15 to 70% of hydrogen peroxide, and importantly containing about 0.3 to 6% of tin. The nitrilo trimethylene phosphonic acid compound is added slowly with stirring to this first aqueous solution containing the tin, in an amount to provide 0.7 to 15% of the second additive.

During the addition of the nitrilo trimethylene phosphonic acid compound, the pH of the solution is held at or above about 4. Where desired the solution can be concentrated up to as high as 100% solids before addition to the hydrogen peroxide solution to be stabilized. Where it is concentrated before use it can either be added directly to the hydrogen peroxide to be stabilized, or predissolved in aqueous hydrogen peroxide or water before use.

The pH of the stabilized hydrogen peroxide is maintained below 4; the natural acidity of the hydrogen peroxide normally causes it to have a suitable pH. The actual pH in any given case may be at any level from 0 to 4 (as measured with a glass electrode) depending on the ultimate use of the material. Suitable inert acids for use in adjusting pH are nitrilo trimethylene phosphonic acid, nitric acid, phosphoric acid, acetic acid and the like; suitable inert alkalies are the alkaline phosphates, ammonium hydroxide, sodium hydroxide, sodium carbonate and the like.

A further additive which is highly effective in stabilized hydrogen peroxide solutions is sodium nitrate, a material which serves to reduce corrosion of metallic surfaces in contact with the aqueous hydrogen peroxide solution. The nitrate is employed where desired in the amount of about 0.001 to 0.1% of the weight of the hydrogen peroxide solution being stabilized.

As used in the following examples, which are presented only by way of illustration of this invention and not by way of limitation thereof, all percentages are given by weight of the total composition. Stabilities of the hydrogen peroxide solutions were determined by storing the solutions for 24 hours at 100° C. in an open vial, and determining the percentage of hydrogen peroxide remaining after this period. This percentage is given as the stability value.

Example A.—Sodium stannate-stabilized hydrogen peroxide solution (comparative)

Three liters of 35% aqueous hydrogen peroxide solution was introduced into a polyethylene container, and 600 g. of sodium stannate trihydrate was dissolved slowly in it with vigorous stirring. Following complete dissolution stirring was stopped and bubbles permitted to dissipate. To the resulting clear solution small aliquots of 85% phosphoric acid were added with vigorous agitation, allowing the solution to clear between additions. This addition of phosphoric acid was continued until the apparent pH of the solution, measured with a glass electrode, was about 3.5 The solution was then diluted to 4 liters with 35% unstabilized hydrogen peroxide. The pH was maintained at 3.5, and the resulting concentrated solution contained 150 g./l. of sodium stannate trihydrate.

Two-tenths of a percent of this solution was added to each of two 70% hydrogen peroxide solutions to provide 300 mg./l. of sodium stannate trihydrate each, and the pH of the 70% solutions so treated was adjusted to 0.2 with 85% phosphoric acid. When a sample of the 70% hydrogen peroxide solution having this pH of 0.2 was diluted to 35% with deionized water, the resulting solution had a pH of 2.3. These 70% solutions were tested as reported in Table 1 which follows Example 2.

Example B.—Nitrilo trimethylene phosphonic acid-stabilized hydrogen peroxide solution (comparative)

Nitrilo trimethylene phosphonic acid was stirred directly into a 70% hydrogen peroxide solution to be stabilized, in the amount of 300 mg./l. The solution so prepared was adjusted in pH with phosphoric acid to pH 0.2 as in Example A. These solutions also were tested as reported in Table 1 which follows Example 2.

Example 1.—Nitrilo trimethylene phosphonic acid and tin separately added to hydrogen peroxide (this invention)

A 70% hydrogen peroxide solution was stabilized with both a sodium stannate trihydrate solution as prepared in Example 1 and nitrilo trimethylene phosphonic acid. The sodium stannate trihydrate solution was added first in an amount to provide 150 mg./l. of sodium stannate trihydrate in the hydrogen peroxide solution, followed by addition of the nitrilo trimethylene phoshonic acid employed in an amount to provide 115 mg./l. of the active material per liter. The solution was adjusted to pH 0.2 with phosphoric acid and this solution was also tested for stability as reported in Table 1 which follows.

Example 2.—Combination nitrilo trimethylene phosphonic acid and tin stabilizer (this invention) (preferred embodiment)

(a) Three liters of 35% unstabilized hydrogen peroxide were introduced into a polyethylene container, and 600 g. of sodium stannate trihydrate were slowly dissolved therein with vigorous agitation. When the sodium trihydrate was completely dissolved, stirring was stopped and the bubbles in the solution permitted to dissipate. Nitrilo trimethylene phosphonic acid was added in the amount of 460 grams (in small increments) with vigorous agitation, with the solution being permitted to clear between additions. The pH of the final solution (measured by a glass electrode) was about 4.0. The solution was then diluted to 4 liters with 35% unstabilized hydrogen peroxide, while the pH was maintained at slightly above 4.0. This yielded a concentrated combination stabilizer solution containing 150 g./l. of sodium stannate trihydrate and 115 g./l. of nitrilo trimethylene phosphonic acid. This solution was added to 70% hydrogen peroxide solution in an amount to provide in the solution 150 mg./l. of sodium stannate trihydrate and 115 mg./l. of nitrilo trimethylene phosphonic acid. The pH of the 70% hydrogen peroxide solution was then adjusted with phosphoric acid to pH 0.2.

(b) This procedure was repeated with the exception that in place of the nitrilo trimethylene phosphonic acid, sodium nitrilo trimethylene phosphonate was employed in the same amount. The pH was held at 4 by addition of phosphoric acid (85%) during introduction of the phosphonate. The pH of the resulting 70% hydrogen peroxide solution prepared employing the prepared combination stabilizer of this Example 2b was adjusted with 85% phosphoric acid to 0.2.

All of the solutions of Examples A to 2 were diluted to 35% with deionized water to which had been added the amounts of contaminant ions indicated in Table 1 which follows, and their stabilities determined.

TABLE 1

| Stabilizer | Stability at Contaminant Levels | |
|---|---|---|
| | 5 mg./l. $Fe^{+++}$ + 0.05 mg./l. $Cu^{++}$ | 5 mg./l. $Fe^{+++}$ + 0.15 mg./l. $Cu^{++}$ |
| | Percent | Percent |
| Example A (Comparative): 300 mg./l. sodium stannate trihydrate | 90.4 | 88.1 |
| Example B (Comparative): 300 mg./l. nitrilo trimethylene phosphonic acid | 0.0 | 0.0 |
| Example 1 (This Invention): 150 mg./l. sodium stannate trihydrate + 115 mg./l. nitrilo trimethylene phosphonic acid (added separately) | 95.4 | 90.3 |
| Example 2a (This Invention): 150 mg./l. sodium stannate trihydrate + 115 mg./l. nitrilo trimethylene phosphonic acid (combination stabilizer) | 96.4 | 90.2 |
| Example 2b (This Invention): 150 mg./l. sodium stannate trihydrate + 115 mg./l. sodium nitrilo trimethylene phosphonate (combination stabilizer) | 95.2 | 90.1 |

Example 3

The stabilizer solutions of Examples 2a and 2b were duplicated with the exception that sodium nitrate was also added in the amount of 600 mg./l. in the 70% hydrogen peroxide solution, to which was added also 5 mg./l. of sodium chloride. The stability of the hydrogen peroxide was essentially the same as that obtained in Examples 2a and 2b as recited in Table 1 above, and the stabilized solution had the added advantage that when the respective stabilized solutions were contacted with aluminum for 12 days the solution containing the sodium nitrate did not affect the aluminum surface, whereas the other solution caused pitting of the aluminum surface.

The following examples demonstrate the advantage of the preferred combination stabilizer of this invention, embodied in Examples 2a and 2b, as regards resistance of 70% hydrogen peroxide stabilized with the combination stabilizer to becoming turbid upon dilution of the 70% hydrogen peroxide with hard water containing 300 mg./l. of hardness as calcium carbonate, and a total dissolved solids of 990 mg./l., to a concentration of 35%.

Example 4

A 70% hydrogen peroxide solution prepared as in Example 2a was diluted to 35% concentration with a hard water as described immediately above. When dilution was carried out and the solution permitted to stand for 24 hours, the solution had a Hellige turbidity of 0 when measured on a Hellige Turbidimeter. This indicated that the solution was water-white.

Example 5

When the hydrogen peroxide solution of Example 1 (stabilized with nitrilo trimethylene phosphonic acid and sodium stannate trihydrate added separately) was diluted to 35% concentration with hard water as described above, and permitted to stand for 24 hours as in the case of Example 4, the solution had a marked turbidity which measured 29 on the Hellige scale. This established that the hydrogen peroxide stabilized with nitrilo trimethylene phosphonic acid and sodium stannate, each added separately, was subject to becoming turbid upon addition to hard waters.

The following comparative examples are presented to demonstrate the advantage of the preferred combination stabilizer (nitrilo trimethylene phosphonic acid and sodium stannate trihydrate) of this invention as compared with several stabilizers heretofore regarded as particularly effective. In each comparative case the stabilizer solutions were made up as in the case of Example 2a, employing in place of the nitrilo trimethylene phosphonic acid the stabilizer indicated in Table 2 which follows:

TABLE 2

[Stability of 35% hydrogen peroxide solution prepared from 70% solution, after dilution with deionized water containing the contaminant ions indicated below in the specified amounts.]

| Stabilizer | 5 mg./l. $Fe^{+++}$ + 0.05 mg./l. $Cu^{++}$ | 5 mg./l. $Fe^{+++}$ + 0.15 mg./l. $Cu^{++}$ |
|---|---|---|
| | Percent | Percent |
| 150 mg./l. sodium stannate trihydrate + 115 mg./l. nitrilo trimethylene phosphonic acid (This Invention) | 96.4 | 90.2 |
| 150 mg./l. sodium stannate trihydrate + 115 mg./l. ethylene diamine tetraacetic acid (Comparative) | 91 | 87.8 |
| 150 mg./l. sodium stannate trihydrate + 115 mg./l. nitrilo triacetic acid (Comparative) | 86.8 | 80.9 |
| 150 mg./l. sodium stannate trihydrate + 115 mg./l. dipicolinic acid (Comparative) | 92.1 | 86.3 |
| 150 mg./l. sodium stannate trihydrate + 300 mg./l. phosphoric acid (Comparative) | 85 | 72.2 |

The above examples demonstrate the effectiveness of the stabilizers of this invention for stabilizing concentrated hydrogen peroxide against decomposition by impurities introduced with water employed to dilute the concentrated material to useful lower concentrations. The data in Table 1 shows the synergistic effect of employing sodium stannate trihydrate and nitrilo trimethylene phosphonic acid together as a stabilizer system, as compared with employing either of the two ingredients alone.

Examples 4 and 5 show that the preferred combination stabilizer of this invention (Example 4) provided a stabilized 70% hydrogen peroxide solution which did not become turbid upon dilution with hard water, whereas the Example 5 material, in which the two ingredients were added separately to the solution being stabilized, did become turbid under the same conditions. This is of obvious advantage to users. The effectiveness of the stabilizers of this invention is demonstrated further by comparison of the stabilizers of this invention with prior art stabilizer systems in Table 2.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What we claim is:

1. An aqueous hydrogen peroxide solution stabilized against decomposition by contaminants, said aqueous hydrogen peroxide solution containing (a) 0.005 to 0.03% of a nitrilo ttrimethylene phosphonic acid compound from the group consisting of nitrilo trimethylene phosphonic acid and the ammonium and alkali metal salts thereof, and (b) a tin compound soluble in aqueous hydrogen peroxide, said tin compound being present in an amount to provide 0.001 to 0.015% of tin in said solution.

2. The stabilized aqueous hydrogen peroxide solution of claim 1 in which the tin is incorporated as sodium stannate trihydrate.

3. The stabilized aqueous hydrogen peroxide solution of claim 1 in which the nitrilo trimethylene phosphonic acid compound is nitrilo trimethylene phosphonic acid.

4. The stabilized aqueous hydrogen peroxide solution of claim 1 in which the nitrilo trimethylene phosphonic acid compound is the sodium salt of nitrilo trimethylene phosphonic acid.

5. The stabilized aqueous hydrogen peroxide of claim 1 containing also 0.001 to 0.1% of sodium nitrate.

6. A method of stabilizing an aqueous hydrogen peroxide solution against decompostion by contaminants, comprising incorporating in said aqueous hydrogen peroxide solution (a) 0.005 to 0.03% of a nitrilo trimethylene phosphonic acid compound from the group consisting of nitrilo trimethylene phosphonic acid and the ammonium and alkali metal salts thereof, and (b) a tin compound soluble in aqueous hydrogen peroxide, said tin compound being present in an amount to provide 0.001 to 0.015% of tin in said solution.

7. The method of claim 6 in which the tin is incorporated as sodium stannate trihydrate.

8. The method of claim 6 in which the nitrilo trimethylene phosphonic acid compound is nitrilo trimethylene phosphonic acid.

9. The method of claim 6 in which the nitrilo trimethylene phosphonic acid compound is the sodium salt of nitrilo trimethylene phosphonic acid.

10. The method of claim 6 in which 0.001 to 0.1% of sodium nitrate is incorporated into the aqueous hydrogen peroxide solution.

11. A combination stabilizer for stabilizing aqueous hydrogen peroxide against the decomposing action of contaminants, comprising an aqueous solution containing (a) at least 0.7% of a nitrilo trimethylene phosphonic acid compound from the group consisting of nitrilo trimethylene phosphonic acid and the ammonium and alkali metal salts thereof, and (b) a tin compound soluble in aqueous hydrogen peroxide, said tin compound being present in an amount to provide at least 0.3% of tin on the weight of said solution, said nitrilo trimethylene phosphonic acid compound and said tin being present in relative proportions such that upon dissolution in a sample of aqueous hydrogen peroxide to be stabilized they provide 0.005 to 0.03% of said nitrilo trimethylene phosphonic acid compound and 0.001 to 0.015% of said tin.

12. The combination stabilizer of claim 11 in which the tin is incorporated as sodium stannate trihydrate.

13. The combination stabilizer of claim 11 in which the nitrilo trimethylene phosphonic compound is nitrilo trimethylene phosphonic acid.

14. The combination stabilizer of claim 11 in which the nitrilo trimethylene phosphonic compound is the sodium salt of nitrilo trimethylene phosphonic acid.

References Cited
UNITED STATES PATENTS

| | | | |
|---|---|---|---|
| 2,904,517 | 9/1959 | Baker | 23—207.5 |
| 2,950,175 | 8/1960 | Johnston | 23—207.5 |

FOREIGN PATENTS

| | | |
|---|---|---|
| 676,653 | 12/1963 | Canada. |

OSCAR R. VERTIZ, *Primary Examiner.*

H. S. MILLER, *Assistant Examiner.*

UNITED STATES PATENT OFFICE
CERTIFICATE OF CORRECTION

Patent No. 3,383,174                          May 14, 1968

Glenn T. Carnine et al.

It is certified that error appears in the above identified patent and that said Letters Patent are hereby corrected as shown below:

Column 2, lines 4 to 9, the formula should appear as shown below:

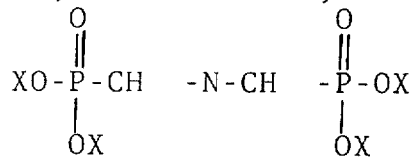

Column 7, line 2, "ttrimethylene" should read -- trimethylene

Signed and sealed this 6th day of January 1970.

(SEAL)
Attest:

Edward M. Fletcher, Jr.                       WILLIAM E. SCHUYLER, JR
Attesting Officer                                  Commissioner of Patents

UNITED STATES PATENT OFFICE
CERTIFICATE OF CORRECTION

Patent No. 3,383,174      Dated May 14, 1968

Inventor(s) Glenn T. Carnine and Leonard R. Darbee

It is certified that error appears in the above-identified patent and that said Letters Patent are hereby corrected as shown below:

Column 2, lines 4-9 the formula should appear as follows:

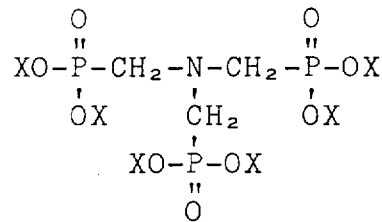

Signed and sealed this 2nd day of May 1972.

(SEAL)
Attest:

EDWARD M. FLETCHER, JR.            ROBERT GOTTSCHALK
Attesting Officer                  Commissioner of Patents